Patented July 27, 1943

2,325,033

UNITED STATES PATENT OFFICE 2,325,033

DESULPHURIZING CATALYST

Alva C. Byrns, Los Angeles, Calif., assignor to Union Oil Company of California, Los Angeles, Calif., a corporation of California No Drawing. Application October 30, 1939, Serial No. 302,018

23 Claims. (Cl. 252—210)

This invention relates particularly to the desulphurization of hydrocarbon fractions, such as petroleum gases, vapors and liquids, and has special application to catalysts for such sulphur removal.

Most petroleum fractions contain more or less sulphur which ordinarily is present principally in the form of organic sulphur compounds. In many instances the sulphur content in gases is so high as to render them objectionable for sale for fuel gas. In other instances various distillates are so high in sulphur as to render them objectionable for uses to which they are adapted, for example as cracking stocks or as motor fuel or the like.

The principal objects of the present invention are to provide a catalyst over which sulphur-bearing petroleum fractions may be passed and by means of which a very high degree of conversion of the organic sulphur compounds into readily removable forms such as hydrogen sulphide may be readily effected. A further object is to provide suitable processes for manufacture of such a desulphurizing catalyst and for desulphurizing hydrocarbon fractions with such catalyst. A catalyst which will effect a high rate of sulphur conversion is of special value because of the fact that some fractions, such as petroleum fractions, will contain as much as 12% of organic sulphur compounds although the actual sulphur content may be only 3%, for example. Where sulphur conversion to hydrogen sulphide is effected, the organic compounds freed from the sulphur are left in the fraction, these compounds in the case of gasoline being valuable motor fuel constituents. Therefore, sulphur conversion as distinguished from complete removal of the sulphur-bearing compounds is of great importance.

I have discovered that these objects may be obtained by passing such sulphur-bearing hydrocarbon fractions over or through a catalyst in the form of a cobalt molybdate. When the fraction is normally liquid, it is preferable, although not always essential, to treat the fraction in vapor phase. Where precipitated cobalt molybdate as such frequently effects a considerable degree of conversion and consequent sulphur removal, it is highly preferable to precipitate the cobalt molybdate in the presence of a hydrous gel, particularly an alumina gel which is a porous gel producible as herein described. It appears to be preferable that the catalyst consisting of hydrous alumina gel and cobalt molybdate contain only about 20% to 25% of cobalt molybdate, and that it is definitely undesirable if the cobalt molybdate exceeds about 50% of the catalyst. A given volume of such a catalyst is as effective as an equal volume of the cobalt molybdate itself. I have further discovered that the catalyst is of outstanding value when the cobalt molybdate is precipitated in the presence of a washed wet aluminum hydroxide gel following its precipitation but before the hydrous alumina gel has been allowed to dry. Under these conditions the molybdate is distributed through the gel and may even react chemically with the gel. The dried catalyst is of such form that it is highly porous and active and exhibits another characteristic distinct from the usual supported molybdate catalyst prepared by precipitating cobalt molybdate onto a dried support, in that when first introduced into use, its activity builds up gradually and continuously to a maximum activity as represented by high sulphur conversion which maximum activity is retained throughout the valuable life of the catalyst, as distinguished from the other catalysts whose activity builds up very rapidly to a maximum and then drops back in the early life of the catalyst to an efficiency value as measured by conversion rate of very much less than the maximum sustained conversion rate of the preferred catalyst prepared by precipitation in the presence of the initially formed wet hydrous gel.

The present invention may, therefore, be said to be based broadly upon the cobalt molybdate desulphurization catalyst. In a narrower and more desirable form the cobalt molybdate is carried upon a gel, preferably an alumina, zirconia, titania or thoria gel, and preferably precipitated in the presence of the original wet hydrous alumina or zirconia or other gel. In its most valuable aspect, the invention is based upon the specific form of catalyst wherein hydrous alumina gel is precipitated from a solution of its salts, such as aluminum nitrate, by the addition of an alkaline material, such as ammonium hydroxide, and after washing but without drying, the cobalt molybdate is then precipitated in the presence of the wet gel, following which the resultant precipitate is thoroughly washed and dried. Inasmuch as the initial cobalt molybdate which is precipitated appears to be at least partially converted into a thio molybdate during the early stages of the desulphurizing operation, the invention in its various phases, as before mentioned, also extends to the use of a corresponding cobalt thio molybdate, such as cobalt tetra-sulpho-molybdate, being especially applicable where the thio molybdate is carried in the gel where produced by precipitation in the presence of the wet alumina gel as described. The invention extends not only to the catalyst produced as indicated, but also to the method of producing the catalyst, and to methods of desulphurizing hydrocarbon fractions through the means of such a catalyst including the specifically valuable catalyst produced by precipitation upon said washed, wet gel carrier, and to similar operations including dehydrogenation, reforming and isomerization.

*Catalyst production*

As indicative of ways of practicing the invention, I have manufactured the preferred form of catalyst above described, that is where the cobalt molybdate has been precipitated in the presence of a washed previously undried alumina gel, by dissolving 2250 grams of chemically pure aluminum nitrate nonahydrate, $Al(NO_3)_3 \cdot 9H_2O$, in 10 liters of distilled water at 200° F. Aluminum hydroxide was precipitated from this solution by the slow addition, accompanied with stirring, of 1200 ml. of concentrated ammonium hydroxide dissolved in 2800 ml. of cold water. The gelatinous hydrated alumina precipitate was separated by filtration, and was washed twice by resuspension in 10 liter portions of distilled water, followed in each instance by filtration. The filtered aluminum hydroxide cake was then suspended in a cold solution of 200 grams of chemically pure cobalt nitrate hexahydrate

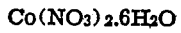

$Co(NO_3)_2 \cdot 6H_2O$ dissolved in 10 liters of distilled water. To this suspension there was added slowly with constant stirring 2 liters of cold aqueous ammonium molybdate solution which contained 120 grams of ammonium paramolybdate. There resulted a gelatinous precipitate which possessed a light rose color. This precipitate was filtered and washed twice by redispersion in 6 liter portions of hot distilled water accompanied by filtering between suspensions. The moist filter cake was then dried at 200° F. for 72 hours, whereby it became a hard, vitreous mass of granules which were black in color, as contrasted with the rose color of cobalt molybdate catalysts prepared by precipitating the cobalt molybdate on a previously dried alumina gel.

In preparing the above described preferred catalyst, the proportions of reagents were such as would give one part by weight of cobalt molybdate to two parts by weight of alumina ($Al_2O_3$). Due to the appreciable solubility of the cobalt molybdate in the wash water, this ratio is not obtained and only about 20% to 25% of cobalt molybdate appears in the final gel catalyst. A similar catalyst was, however, made with much larger proportions of cobalt and molybdenum salts which resulted in a cobalt molybdate content of about 50%. This catalyst possessed a deep blue-black color. According to various tests, this high content appears to represent about the desirable maximum. The optimum appears to be well below 50%, probably between about 10% and 30% and apparently within the narrower range of about one-sixth to one-fourth of the total catalyst.

In preparing the usual form of gel catalyst where dried gel was employed, the alumina gel was prepared as before, and the washed filter cake was then dried at 200° F. for 48 hours and then at 400° F. for 16 hours. This gel was then ground in a porcelain ball mill for 3 hours. 300 grams of this ground dried material was then suspended in water, and cobalt molybdate was precipitated thereon by adding solutions of cobalt nitrate and ammonium paramolybdate with ammonium hydroxide in substantially the same manner as previously described. The resultant catalyst was rose colored, indicating that the cobalt molybdate was probably in the same chemical and physical form as it is when precipitated in the absence of dried alumina.

Where the cobalt molybdate itself was precipitated without a carrier, a cobalt nitrate solution was prepared by dissolving 2270 grams thereof in 10 liters of cold water, and into this was stirred a solution containing 1365 grams of ammonium paramolybdate and 800 ml. of concentrated ammonium hydroxide. The resultant precipitate was filtered, washed twice with resuspension in 10 liter portions of water and followed by filtration until dry. The washed filter cake, which had a rose color, was dried at 200° F. for 48 hours with little change in color. This material did not possess any gel structure and was, therefore, pulverized to pass through a 20 mesh screen, whereupon it was combined with 4% of fine flake graphite to adapt the powder to pelleting, one-eighth inch pellets being then formed.

*Use of the catalyst*

In using the various catalysts, various contact procedures known to the industry may be employed. The desirable procedure is to place the catalyst in tubes, trays or other appropriate containers, and pass therethrough the material to be desulphurized. These materials may be in their normal state where gases, and where they are normally liquid they will preferably be passed through or over the catalyst in the form of vapors, although it would be, in many instances, feasible to pass the material in its liquid state through the catalyst or commingle it therewith.

For most operations, the desulphurization stage would be carried on at temperatures between about 550° F. to 900° F. or even at 950° F., under which conditions it is convenient to operate in the vapor state where the material is normally liquid. In so operating, it is ordinarily necessary to introduce hydrogen with the gases for the purpose of the desulphurizing reaction itself in order to convert the sulphur by combination with the hydrogen to yield hydrogen sulphide.

In a preferred form of operation, the liquid material is preheated to convert it into vapor form, and this together with about 400% of hydrogen is then passed over or through the catalyst at the selected operating temperature, for example about 650° F. In desulphurizing gases, a similar percentage of hydrogen is introduced and operation effected at similar temperatures. It has also been found desirable in many instances to operate under pressure, especially when treating vapors of normally liquid gasolines. Pressures ranging from atmospheric to 300 pounds per square inch gauge have been employed. A desirable pressure appears to be around 150 to 200 pounds per square inch gauge inasmuch as most of the sulphur can then be removed and only a very moderate sulphur-removal increase is effected above 200 pounds. Some of the advantages in the employment of pressure are that the ratio of volume of liquid feed per hour to catalyst volume can be increased and catalyst life is markedly prolonged.

As a specific example of runs which have been made, a Santa Maria Valley (California) viscosity reduction pressure distillate was employed in the manufacture of gasoline. This material contained 3% sulphur by weight, representing about 12% by volume of organic sulphur compounds, principally thiophenes. The sulphur content of this material was consistently lowered to 0.01% to 0.02% during many runs, this condition being maintained in some instances during a catalyst life of over 600 hours. These runs were effected by vaporizing the liquid material at the rate of 100 ml. per hour, commingling such vapors with 60 liters of hydrogen, and passing such combined materials over 50 ml. of the above described catalyst in which the cobalt molybdate had been precipitated in the presence of the washed wet hydrous alumina gel.

The recovered products are in the form of gases and vapors in which the converted sulphur is present in the form of hydrogen sulphide. The desulphurized vapors were condensed to yield the final product which amounted to a recovery of 98% based on the liquid originally treated. The hydrogen sulphide was thus separated from the system as a gas. In this particular operation the process was carried on under a pressure of approximately 100 pounds per square inch. However, similar operations have been conducted at atmospheric pressure in which the sulphur content was reduced to about 0.5%. These catalysts contain about 20% of cobalt molybdate carried on the described hydrous alumina gel. It does not appear that contact time is critical so long as contact of all the vapors with the catalyst is insured. A wide range of contact periods has been employed with satisfying results. At the same time it does not yet appear that the operating temperature is critical insofar as desulphurization is concerned because temperatures of 650° F. to 800° F. and even up to about 950° F. have been employed with satisfactory results. However, as the temperature is increased the knock rating of the product increases due to dehydrogenation and reforming, particularly in the range of 900° F. to 1000° F.

The other catalysts described have been employed in similar fashions at atmospheric pressure but with a considerably smaller reduction in sulphur content. For example, the catalyst formed on previously dried alumina gel reduced the sulphur content to only about 1.0%, with an effective catalyst life of 72 hours. Cobalt molybdate itself, not supported on a carrier, when used under similar conditions was capable of effecting a sulphur reduction to only about 1.5%, and at the same time required 100 grams of catalyst to produce this effect compared to 50 grams of the preferred catalyst.

Perhaps the most important aspect of the invention is that based upon the cobalt molybdate which was precipitated in the presence of the freshly formed hydrous alumina gel before it had ever been dried. As has been indicated, this catalyst has resulted in a uniform reduction of sulphur content to a lower percentage than any of the other catalysts, and it has been able to maintain its activity while effecting such high sulphur reduction, for a much longer life and for a treatment of much larger quantities of feed stock than any other catalyst. Thus this catalyst has had an active life of six weeks and has treated 85 liters of feed stock per 100 ml. of catalyst containing only 25 grams of cobalt molybdate and reducing the sulphur content to only 0.01%. 50 grams of cobalt molybdate itself was capable of treating only 25 liters of feed to the same sulphur content over a period of ten days.

It seems quite evident that the catalyst formed where the cobalt molybdate has been precipitated in the presence of the hydrous alumina gel has a substantially different constitution from the other catalyst. This is manifested by the fact that in treating the above described gasoline feed stock containing about 3% sulphur at atmospheric pressure, the sulphur content of the treated material has dropped fairly rapidly (to about 1.4%) until about 400 ml. of feed has been treated, and then more gradually to its maximum desulphurization ability by the time about 2,000 ml. of feed has been treated, whereupon the maximum desulphurization continued. In contrast to this, the other catalysts dropped rapidly to a maximum desulphurizing value where the sulphur content was reduced to between about 0.2% and 0.5% when 500 ml. of feed had been treated and then rose rapidly to a final sulphur content in the treated material of between about 1% and 1.5% when 1,000 to 1,500 ml. had been treated which then continued for the life of the catalyst. Further, the black color of the preferred catalyst indicates that the cobalt molybdate, which is normally rose colored, is not present in its normal form and may be even chemically combined in some manner with the hydrous alumina gel, or at least is so strongly adsorbed by the hydrous gel that on subsequent drying the normal crystal structure of the cobalt molybdate is altered in such a manner as to give a catalytic material of considerably enhanced activity.

These catalysts are also valuable n similar manner for dehydrogenation, reforming and isomerization. It has been determined that, especially when operating under pressure, and in the continued presence of hydrogen after desulphurization as above described, if the temperature is raised into the range between 950° F. and 1100° F., dehydrogenation and reforming occur, thereby increasing the value of the product for motor fuel by reason of an increased anti-knock rating. This two-stage operation can be achieved by recycling or continuing the materials through additional catalyst. Under conditions similar to those required for dehydrogenation and reforming, isomerization of appropriate stocks also can be effected by the same preferred catalyst, with correspondingly high results.

These catalysts are useful also for desulphurizing aromatic solvents and the like because, although in the presence of hydrogen, desulphurization results without hydrogenation, thereby not reducing the aromatic content of the product. This applies especially to such aromatic fractions derived from petroleum. At the higher operating range above indicated, namely about 900° F. to 1100° F., dehydrogenation occurs with consequent increase in aromatic content.

*Catalyst states*

After the preferred catalyst which has been precipitated in the presence of undried alumina gel is initially prepared, the alumina gel is largely a hydrous oxide or hydroxide and the cobalt molybdate compound is probably principally in the form of a cobalt molybdate possibly of the formula $CoO.MoO_3$. After the catalyst is heated, both in the drying stage and in the stage of use, it is probable that the hydrous aluminum hydroxide is at least partially dehydrated, although it does not appear that the hydrous aluminum hydroxide is ever completely changed to the oxide form. When the catalyst is put to use for desulphurizing purposes, it is probable that at least a portion of the cobalt molybdate is slowly converted from the oxide form to cobalt thiomolybdate by reason of the substitution of sulphur for the oxygen. It is possible that a portion of the catalyst is completely converted to cobalt tetrathiomolybdate or to cobalt trithiomolybdate or a mixture of the two. It is possible that as the activity of the catalyst picks up toward the stage of maximum desulphurization, an increasing amount of cobalt trithiomolybdate is produced. It is not known how much of the catalyst is in the cobalt molybdate or oxide form nor how much is in the cobalt thiomolybdate form when the catalyst reaches its maximum desulphurizing capacity or "steady state." In all these instances, however, the catalyst retains its typical porous gel structure.

In addition to using alumina gels as before described, very similar effects are obtained by the use of hydrous zirconia, titania and thoria gels where the catalysts are prepared in the same fashion as the alumina gel catalysts.

It is apparent from the highly satisfactory results produced and from the fact that thiomolybdates are formed at least in part as the activity of the catalyst increases, that it is not a catalyst which is poisoned by sulphur and similar compounds. It is also apparent that the method of deposit of the molybdate in the presence of the hydrous alumina gel, that is, while the gel is still in a fresh or undried state, accounts for the high catalytic activity of the material.

I claim:

1. A catalyst comprising material from the class consisting of cobalt molybdate of the probable formula $CoO.MoO_3$ and cobalt thiomolybdate of the probable formula $CoO.MoO_3$ having S substituted in part for O precipitated upon a previously undried synthetic hydrous metal oxide gel.

2. A desulphurizing catalyst comprising cobalt molybdate of the probable formula $CoO.MoO_3$ precipitated upon a previously undried hydrous metal oxide gel.

3. A catalyst comprising cobalt molybdate of the probable formula $CoO.MoO_3$ synthetic gel carrier of the class consisting of aluminum, zirconium, titanium and thorium hydroxide gels.

4. A desulphurizing catalyst comprising cobalt molybdate upon a porous gel prepared by precipitating the molybdate upon a previously undried synthetic gel of the class consisting of hydrous aluminum, zirconium, titanium and thorium oxide gels.

5. A catalyst according to claim 4 wherein the gel is a hydrous zirconia gel.

6. A catalyst prepared by precipitating an aluminum hydroxide gel in an alkaline solution, filtering and washing the gel and precipitating cobalt molybdate upon the washed undried aluminum hydrous oxide gel.

7. A method for preparing a catalyst comprising precipitating a hydroxide from a solution of a salt of metals of the class of metals consisting of aluminum, zirconium, thorium and titanium, filtering and washing the precipitated hydroxide, suspending the hydroxide in a solution, supplying thereto solutions of cobalt and molybdenum salts and precipitating upon said hydroxide the cobalt molybdate, and separating and drying the resultant gel carrying the cobalt molybdate.

8. A method according to claim 7 wherein the hydroxide is aluminum hydroxide.

9. A catalyst comprising cobalt thiomolybdate of the probable formula $CoO.MoO_3$ having S substituted in part for O precipitated upon a previously undried porous hydrous metal oxide gel.

10. A desulphurizing catalyst comprising cobalt thiomolybdate carried upon a porous hydrous metal oxide gel prepared by precipitating cobalt molybdate upon a previously undried hydroxide gel, and converting the molybdate to thiomolybdate.

11. A catalyst according to claim 10 wherein the gel is of the class consisting of aluminum, zirconium, titanium and thorium synthetic hydrous oxide gels.

12. A catalyst according to claim 10 wherein the gel is an aluminum synthetic hydrous oxide gel.

13. A catalyst according to claim 10 wherein the gel is a zirconium hydrous oxide gel.

14. A desulphurizing catalyst comprising cobalt molybdate of the probable formula $CoO.MoO_3$ metal hydrous oxide gel wherein the gel constitutes a proportion of the catalyst at least about as large as the molybdate.

15. A catalyst according to claim 3 wherein the gel constitutes at least about 50% of the catalyst.

16. A catalyst according to claim 4 wherein the gel constitutes a proportion of the catalyst at least about as large as the molybdate.

17. A catalyst according to claim 4 wherein the gel is hydrous zirconium oxide gel constituting a proportion at least about as large as the proportion of molybdate.

18. A catalyst according to claim 6 wherein the proportion of cobalt molybdate in the dried catalyst product is less than the proportion of the aluminum oxide gel.

19. A catalyst according to claim 9 wherein the molybdate is present in proportion less than that of the gel.

20. A catalyst according to claim 10 wherein the gel is present in proportion at least as great as that of the molybdate.

21. A catalyst according to claim 10 wherein the gel is from the class consisting of aluminum, zirconium, titanium and thorium oxide gels approximating at least about 50% of the catalyst.

22. A catalyst according to claim 10 wherein the gel is aluminum hydrous oxide gel in proportion at least as great as the proportion of molybdate.

23. A catalyst according to claim 10 wherein the gel is zirconium oxide gel present in proportion at least as great as the proportion of the molybdate.

ALVA C. BYRNS.